United States Patent [19]

Ranke et al.

[11] Patent Number: 4,609,384
[45] Date of Patent: Sep. 2, 1986

[54] MULTIPLE TEMPERATURE LEVEL REGENERATION OF CO2 FROM PHYSICAL SOLVENT

[75] Inventors: Gerhard Ranke, Pocking; Horst Weiss, Munich, both of Fed. Rep. of Germany

[73] Assignee: Linde Aktiengesellschaft, Wiesbaden, Fed. Rep. of Germany

[21] Appl. No.: 677,956

[22] Filed: Dec. 4, 1984

[30] Foreign Application Priority Data

Dec. 5, 1983 [DE]  Fed. Rep. of Germany ....... 3343916

[51] Int. Cl.⁴ .............................................. B01D 53/14
[52] U.S. Cl. .......................................... 55/40; 55/43; 55/48; 55/68; 55/73
[58] Field of Search ................... 55/40, 43, 44, 46, 47, 55/48, 51, 68, 73; 62/17

[56] References Cited

U.S. PATENT DOCUMENTS

| | | | |
|---|---|---|---|
| 4,050,909 | 9/1977 | Ranke | 55/48 |
| 4,270,937 | 6/1981 | Adler et al. | 62/17 |
| 4,294,590 | 10/1981 | Linde et al. | 55/48 |
| 4,324,567 | 4/1982 | Ranke et al. | 55/43 |
| 4,345,918 | 8/1982 | Meissner | 55/46 X |
| 4,370,156 | 1/1983 | Goddin et al. | 62/17 |
| 4,378,977 | 4/1983 | Linde et al. | 55/48 |

*Primary Examiner*—Charles Hart
*Attorney, Agent, or Firm*—Millen & White

[57] ABSTRACT

To regenerate a physical solvent, loaded with sour gases, especially $CO_2$ and $H_2S$, the loaded solvent is treated with a stripping gas and/or is expanded to separate absorbed $CO_2$ and the resultant solvent is subjected to thermal regeneration to desorb $H_2S$. To reduce energy requirements during regeneration, the $CO_2$ desorption is conducted on at least two different temperature levels, the second being for example 30°–80° C. higher than the first, with the first being conducted, e.g., at about those low temperatures conventional to low temperature absorption systems.

23 Claims, 2 Drawing Figures

4,609,384

MULTIPLE TEMPERATURE LEVEL REGENERATION OF $CO_2$ FROM PHYSICAL SOLVENT

BACKGROUND OF THE INVENTION

This invention relates to a process and apparatus for the regeneration of a physical solvent loaded with sour gases, especially $CO_2$ and $H_2S$.

To obtain a concentrated $H_2S$ fraction in a selective, sour gas scrubbing process using a physical solvent, it is conventional to strip the solvent loaded with $H_2S$ and $CO_2$ in an enrichment column, under reduced pressure with an inert gas, normally $N_2$, so that the main quantity of $CO_2$ is desorbed and the more readily soluble $H_2S$ remains at least partially in the solvent. At the same time, the $H_2S$ is reabsorbed from the rising gaseous mixture in the upper section of the enrichment column by contact with a solvent free of $H_2S$. This technique results in an $H_2S$-free residual gas comprised primarily of $CO_2$ and $N_2$ as head product, and an $H_2S$-containing solvent as bottom product.

To obtain the $H_2S$ fraction and/or for solvent regeneration, the solvent is freed of $H_2S$ in a subsequent hot-regenerating column by a reboiler wherein the $H_2S$ is withdrawn as a overhead stream.

It is possible, theoretically, to strip off increasing amounts of $CO_2$ by correspondingly increasing the amount of stripping gas, thus attaining a greater $H_2S$ concentration. However, this method cannot be applied to practical conditions, since with an increase in the amount of stripping gas, the amount of solvent at the head required for reabsorbing the $H_2S$ is likewise increased automatically and consequently an increased amount of solvent must, in turn, be treated in the lower section of the column. Simultaneously, with an increase in the amount of stripping gas, other characteristics of the column change as well since, together with the $CO_2$, also a greater quantity of $H_2S$ is stripped off, whereby the $H_2S$-reabsorption section is subjected to a significant increase in the heat of solution.

It is known, as an alternative $H_2S$ enrichment, to recycle part of the $H_2S$ fraction from the head of the hot-regenerating column to the enrichment column and to reabsorb the $H_2S$ from this fraction. However, in order to provide greater $H_2S$ enrichment, a large portion of the head product from the hot-regenerating column must be recycled thereby resulting in considerable increases in refrigeration losses for the enrichment column ($H_2S$ absorption), for the scrubbing agent vapor condensation, as well as in the thermal requirement for the hot-regenerating column (multiple driving out of $CO_2$ and $H_2S$), and in the extent of saturation with scrubbing agent vapor in the recycled portion. Nevertheless, since, in many cases, the amount of nitrogen available as stripping gas is limited, for example, due to a previous design of the air fractionation unit for obtaining $O_2$ for the partial oxidation of C-containing feedstocks, it has been necessary heretofore to additionally concentrate the $H_2S$ fraction with respect to $H_2S$ by means of the above-described recycling method.

It is also known to effect $H_2S$ concentration even without the use of a stripping gas. In this case, the loaded solvent is expanded to a lower pressure to obtain a gaseous $CO_2$ fraction. This fraction is then compressed to the pressure of a reabsorption column and the gaseous fraction is processed therein. In this process, the pressure in the expansion vessel is dependent on the required $H_2S$ concentration in the $H_2S$ fraction. In this connection, a high energy requirement must be met for the vacuum separation of the $CO_2$ fraction, particularly at a low $H_2S$ content in the raw gas or in case of a required high $H_2S$ concentration in the $H_2S$ fraction. Specific details of this process are found in U.S. Pat. No. 4,324,567.

SUMMARY OF THE INVENTION

An object of an aspect of this invention is to provide an improved process over the types mentioned hereinabove, and which suitably permit the utilization, if desired, enrichment column as well.

An object of another aspect of this invention is to provide apparatus for conducting the process of this invention.

Upon further study of the specification and appended claims, further objects and advantages of this invention will become apparent to those skilled in the art.

To attain these objects, the $CO_2$ desorption from the physical solvent is conducted at different temperature levels, especially at at least two different levels.

It has been discovered when attempting to increase the $H_2S$ concentration of the $H_2S$ fraction while saving energy, that by driving out the $CO_2$ at two different temperature levels a concentration of $H_2S$ can be attained substantially more economically than by the above-discussed processes. In general about 80 to 95%, preferably 90 to 95% of the $CO_2$ in the loaded scrubbing agent is removed in a low temperature stage and about $\Lambda$ to $\Lambda 5$, preferably $\Lambda$ to 5% if the $CO_2$ is removed at a high temperature stage, based on the total $CO_2$ in the loaded scrubbing agent.

According to an advantageous embodiment of the process of this invention, the solvent, partially freed of $CO_2$ by stripping, is heated and, at an elevated temperature, treated with a stripping gas for the extensive separation of $CO_2$. In this method, the cold, partially stripped solvent from the enrichment column is suitably first heated against regenerated solvent and then stripped with stripping gas at an elevated temperature. In principal, the higher temperature stripping step can be conducted at any temperature higher than that of the cold partially stripped solvent leaving the first step and lower than that of the temperature of the regenerated solvent leaving the thermal regeneration zone. The temperature difference between the two stripping steps is generally at least about 20° C., preferably at least about 40° C., and in general more particularly in the range of approximately 30° to 80° C., especially about 50° to 70° C.

The amount of inert gas required for stripping out a dissolved gas from a liquid is dependent, under constant pressure, only on the solubility of the respective gas, which decreases with increasing temperature. Therefore, at an elevated temperature, e.g., about 10° to 50° C., especially about 20° to 40° C., the dissolved $CO_2$ can be driven out with a reduced quantity of stripping gas. Consequently, for obtaining a specific $H_2S$ concentration in the sour gas, a smaller amount of stripping gas is required than when stripping at low temperatures, e.g., about −65° to −10° especially about −43 to −25° C. Since the gaseous stream leaving the warm-stripping zone contains, in correspondence with its solubility, $H_2S$ besides $CO_2$, this gaseous stream must be further purified.

Thus, the process is preferably conducted by first driving off the main quantity of $CO_2$ in a first, low temperature enrichment column in the lower section thereof and the simultaneously desorbed $H_2S$ is reabsorbed in the upper section of the column by means of an $H_2S$-free solvent. For this purpose, a portion of the stripping gas is introduced at the lowermost plate of this column. By heating the cold stripped solvent at an intermediate temperature higher than the cold stripping stage preferably by 30°–80° C., especially by 50°–70° C., additional $CO_2$ is driven off. Advantageously at the intermediate warm temperature, a reduced amount of stripping gas is used, especially the remainder of the stripping gas available, namely up to 50%, preferably, 10–30%. The head product containing $CO_2$, inert stripping gas, and some $H_2S$, from the warm-stripping step optionally after cooling thereof, is introduced into the middle zone of the $CO_2$-stripping section of the low temperature stripping column (the enrichment column) and acts therein as additional stripping gas for the cold rough purifying step.

By dividing the $CO_2$ stripping stage into a low temperature rough-stripping zone and a warm fine-stripping zone, one obtains the following additional advantageous effect. For removing $CO_2$ in the gaseous phase from a loaded solvent, a specific amount of heat is required which is taken from the solvent and leads to cooling off of the solvent. During the low temperature roughstripping step this cooling occurs in a temperature range which can be used for cooling of fluid in the preceding scrubbing column and thus leads to a saving in external refrigeration. In other words, the cooling effect in the rough stripping step lowers the temperature of the solvent to a temperature approximate to that of the scrubbing fluid, i.e., the solvent passed into the main scrubbing column. In this way, the low temperature in the rough-stripping can be defined as having a sufficiently cold temperature range so as to provide some of the low temperature cooling of the fluid in the main scrubbing column, the specific temperature of the scrubbing fluid entering the main scrubbing column being dependent on conventional parameters such as compositions of charge, the particular scrubbing agent, etc.

In contrast to the cold stripping step, during the warm-stripping step the cooling of the solvent at a higher temperature level is of no apparent thermodynamic usefulness for reducing the external refrigeration requirements for the conventional low temperature absorption stage.

According to an alternative embodiment of the process of this invention, the solvent, partially freed of $CO_2$ in a first pressure stage column is further expanded, heated, and introduced into a phase separator, and the thus obtained gaseous, $CO_2$-containing fraction is compressed, cooled, optionally after compression, and reintroduced into the first pressure stage column, whereas the thus obtained liquid fraction is conducted to the $H_2S$ separation. By operating in this manner, the energy requirements can also be reduced, using $CO_2$ separation by expansion, if a phase separator (warm) is employed after the partial heating-up step. In this process, it may in some cases be economical to lower the pressure of the warm phase separator to below the pressure of the enrichment column (first expansion) and to compress the gas removed therefrom. Here again, just as in the method with the use of stripping gas, the heating-up step is conducted in heat exchange preferably with regenerated solvent at preferably about 30°–80° C., especially about 50°–70° C. above the temperature of the first pressure stage column, i.e., the enrichment column. The particular temperature employed in the warm phase separator must be higher than that of the partially stripped solvent leaving the enrichment column and lower than that of the regenerated solvent leaving the thermal regeneration zone.

By using the novel process steps (heating-up and phase separation), the coupling between the vacuum engine and the $H_2S$ concentration stage can be omitted. Lowering of the pressure in the low temperature expansion vessel can be effected purely based on economic considerations, i.e., based on a comparison between the cold obtained by degasifying the loaded liquid and the energy requirement for compression of the degasified flash gas and cooling to the operating temperature of the reabsorption stage.

The invention moreover relates to an apparatus for conducting the process, with an $H_2S$ enrichment column and with a hot-regenerating column connected via a connecting conduit at the head to the sump of the enrichment column, characterized in that at last one heat exchanger is arranged in the connecting conduit, this heat exchanger being in communication via a conduit with the sump of the hot-regenerating column. In this arrangement, a stripping column or alternatively at least one phase separator is located in the connecting conduit, wherein the stripping column and/or the separator is connected overhead with the $H_2S$ enrichment column and via the sump with the hot-regenerating column.

Suitable solvents for the process of this invention are all physical absorption agents exhibiting, in particular, a selectivity for $H_2S$ as compared with $CO_2$. These solvents are, in particular, alcohols, such as methanol, ketones, N-methyl-pyrrolidone, dimethylformamide, polyethylene glycol ether, aromatics.

BRIEF DESCRIPTION OF FIGURES

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF FIGURES

Figure 1:
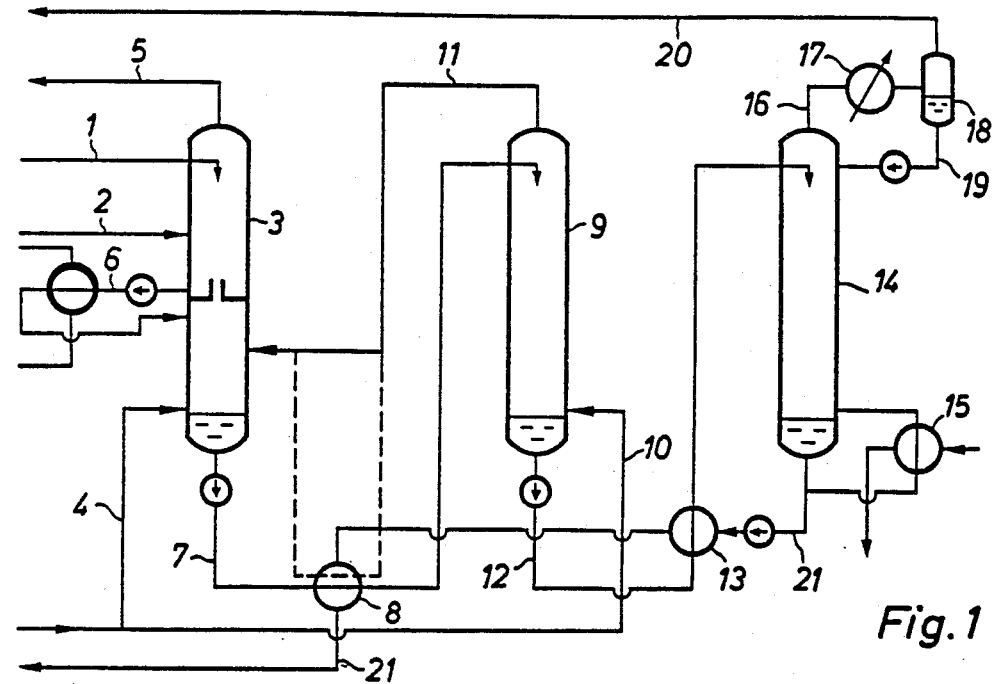
FIG. 1 is a schematic flowsheet illustrating a comprehensive preferred embodiment of the process with the use of a stripping gas.

According to FIG. 1, an $H_2s$ enrichment column 3 is charged, via conduit 1, from a preceding scrubbing stage, not shown, with 60 m$^3$/h of $CO_2$-loaded methanol at a temperature of −54° C. and, via conduit 2, with 40 m$^3$/h of $H_2S$-loaded methanol at a temperature of −50° C. Overall there are 18,000 Nm$^3$/h $CO_2$ and 77 Nm$^3$/h $H_2S$. The operating pressure of column 3 is 2.4 bar. At the same time, via conduit 4, 2,000 Nm$^3$/h of a stripping gas, e.g., $N_2$, is introduced at a temperature of 30° C. into the column 3 in the lower part thereof. The rising stripping gas desorbs $CO_2$ absorbed in the methanol so that a residual gas containing primarily $CO_2$ and $N_2$ is withdrawn overhead via conduit 5. In the upper section of column 3 about 75% by volume of $CO_2$ are stripped off and in the lower section about 20% by volume of $CO_2$. In a following warm-stripping column 9 about 4% by volume of $CO_2$ are stripped off whereby $H_2S$ is enriched from about 10 to about 30% by volume. Finally, in a hot-regenerating column 14 about 1% by volume of $CO_2$ is stripped off.

The stripping gas would also drive out a portion of $H_2S$, more readily soluble in the methanol. To prevent this from occurring, the $H_2S$ is reabsorbed by means of the $CO_2$-containing methanol introduced in the upper zone of the column 3.

Via conduit 6, the entire methanol is removed at a temperature of $-55°$ C. and, after being warmed to $-30°$ C. in a heat exchanger against scrubbing liquid being passed to the scrubbing column (not shown), is reintroduced into column 3. By the warming step, addition $CO_2$ is desorbed from the methanol.

Via conduit 7, the methanol, partially freed of $CO_2$, is withdrawn at a temperature of $-37°$ C., heated to $34°$ C. in heat exchanger 8 against regenerated methanol, and introduced at the top of a second $H_2S$ enrichment column 9 (warm-stripping column). The column 9 operates under a pressure of 2.7 bar. This column 9 is charged in the lower zone via conduit 10 with 400 $Nm^3/h$ of the stripping gas at a temperature of $+30°$ C. The stripping gas drives out the $CO_2$ still present in the methanol, along with some $H_2S$, so that there is withdrawn from the head of column 9 via conduit 11, 900 $Nm^3/h$ of residual gas consisting of $CO_2$, $N_2$, and 25 $Nm^3/h$ of $H_2S$ at a temperature of $34°$ C. This residual gas is recycled to the column 3 in the lower zone for reabsorption of $H_2S$. It is thus seen that column 9 operates at a substantially uniform temperature.

Methanol extensively freed of $CO_2$ is removed via conduit 12 at a temperature of $32°$ C., heated to $87°$ C. in heat exchanger 13 in heat exchange with hot ($102°$ C.), regenerated methanol, and introduced to the upper zone of a hot-regenerating column 14. The hot-regenerating column 14 operates under a pressure of 3 bar and is equipped with a steam-fed reboiler 15 in the sump. By means of this reboiler, the $H_2S$ absorbed in the methanol is driven out and withdrawn from the head of column 14 via conduit 16. After being cooled in a cooler 17 against external refrigeration (20,000 kcal/h) and subjected to phase separation in phase separator 18 condensed methanol is recycled into column 14 via conduit 19, and 275 $Nm^3/h$ of a 28 mol-% $H_2S$ fraction is obtained via conduit 20 at a temperature of $-35°$ C. Via conduit 21, regenerated methanol at $102°$ C. is withdrawn from the sump of the hot-regenerating column 14 and, after being cooled in heat exchangers 13 and 8, is recycled into an upstream scrubbing stage (not shown).

By operating the process in this manner, as compared with the heretofore conventional method without a warm-stripping column 9, under otherwise identical conditions, a saving of external refrigeration is achieved of 70,000 kcal/h, resulting especially from a reduced energy consumption of external refrigeration conventionally required for cooling the overhead product of the hot-regenerating column 14 in cooler 17.

Figure 2:
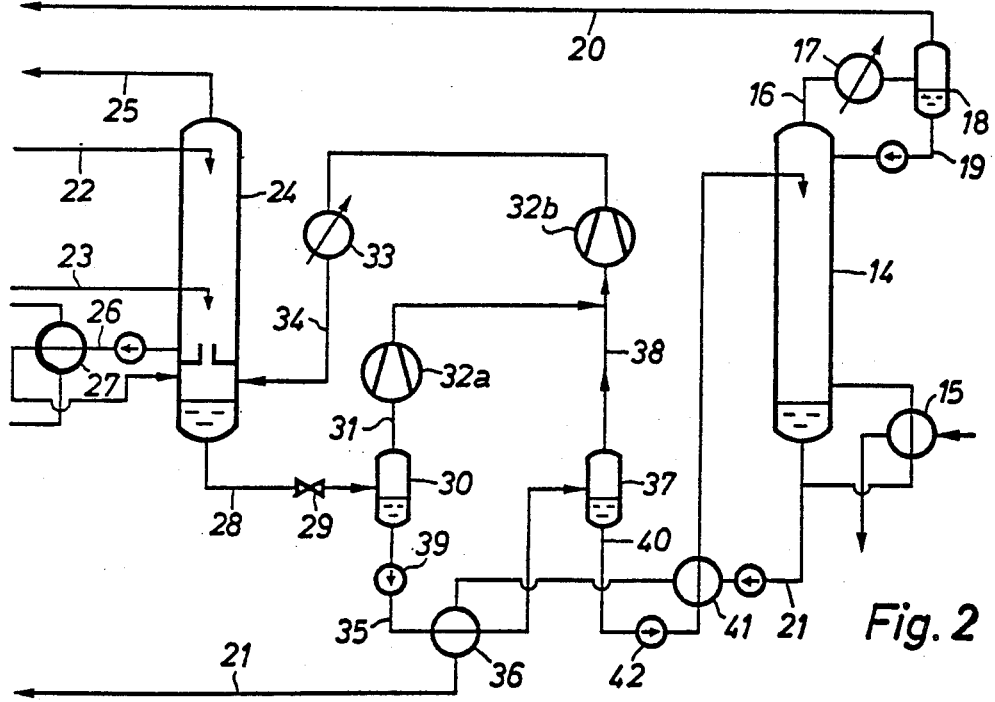
FIG. 2 is similar to FIG. 1 but with expansion steps and no stripping gas.

According to FIG. 2, 60 $m^3/h$ of $CO_2$-loaded solvent from a preceding scrubbing stage, not shown, is expanded via conduit 22 into an $H_2S$ enrichment column 24 operating at 2.1 bar, and 40 $m^3/h$ of $H_2S$-loaded solvent is likewise expanded, via conduit 23, into this column amounting to 2,475 $Nm^3/h$ and containing 74 $Nm^3/h$ of $H_2S$. By virtue of this lowered pressure, the less readily soluble $CO_2$ is driven out of the solvent and withdrawn from the head of column 24 via conduit 25. To prevent concomitant removal of $H_2S$, the $H_2S$ is reabsorbed by means of the $CO_2$-loaded solvent introduced into the upper zone of the enrichment column 24.

By way of conduit 26, the entire solvent is removed from the middle of column 24 at a temperature of $-55°$ C., warmed in a heat exchanger 27 to $-29°$ C., and reintroduced into column 24. By this warming step, additional $CO_2$ is desorbed from the solvent.

Solvent partially freed of $CO_2$ is removed via conduit 28 at a temperature of $-29°$ C., expanded to a pressure of 0.4 bar via valve 29, and introduced into a phase separator 30. By the expansion, additional $CO_2$ is separated in the gaseous phase and is withdrawn as a gaseous fraction from the phase separator 30 via conduit 31, compressed into a two-stage compressor 32a, 32b to 1.2 and 2.1 bar, respectively, and, after being cooled in cooler 33 against external refrigeration, reintroduced via conduit 34 into column 24 for reabsorption of $H_2S$.

The methanol from phase separator 30, still loaded with $CO_2$ and $H_2S$, is withdrawn by pump 39 at a temperature of $-39°$ C. via conduit 35, warmed to $32°$ C. in heat exchanger 36 in heat exchange with regenerated solvent, and conducted to a further phase separator 37 operating at a pressure of 1.2 bar. By the warming step, additional $CO_2$ is driven out and is discharged from separator 37 as a gaseous fraction (490 $Nm^3/h$, of this 31 $Nm^3/h$ being $H_2S$) via conduit 38 and, after being compressed in compressor 32b to 2.1 bar and then cooled, is likewise introduced into column 24.

The methanol, now extensively freed of $CO_2$, is removed from phase separator 37 via conduit 40, pumped by pump 42 to the pressure of the down stream hot-regenerating column 14, heated to $87°$ C. in heat exchange (41) with hot, regenerated solvent, and introduced into column 14 at the top. The hot-regenerating column 14 is operated in the manner described in FIG. 1.

In principle, stripping column 9 or phase separator 30 can work at each temperature between the sump temperature of column 3 and the sump temperature of the regenerating column 14. For selecting the optimum temperature, however, there are several important considerations which may partly offset each other; as follows:

(1) At higher temperatures the $CO_2$ desorption can be achieved with less stripping gas, i.e., with a given quantity of stripping gas there can be obtained a better $H_2S$ concentration.

(2) At higher temperatures the vapor pressure of the solvent increases. Thus, in the cold stripping column 3 more solvent vapor is to be condensed whereby the cold demand of the column increases.

In general, column 9 or phase separator 37 conveniently works at ambient temperature as the sump temperature, i.e. between $20°$ C. and $40°$ C. but because of the above consideration, it is clear that temperatures outside this range may be employed as the optimum, the selection thereof being calculable by an engineer or obtained by routine experimentation.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the regeneration of a physical solvent containing absorbed sour gases comprising $CO_2$ and $H_2S$, wherein the loaded solvent is treated with a stripping gas and/or expanded to desorb $CO_2$, and the resultant solvent is subjected to thermal regeneration to desorb $H_2S$, the improvement comprising conducting the $CO_2$ desorption at two or more different temperature levels in at least two serially connected steps, yielding at a lower temperature a solvent partially freed of $CO_2$ and then yielding at a higher temperature a solvent more extensively freed of $CO_2$, said higher temperature being lower than the resultant regenerated solvent withdrawn from the thermal regeneration zone.

2. In a process for the regeneration of a physical solvent containing absorbed sour gases comprising $CO_2$ and $H_2S$, wherein the loaded solvent is treated with a stripping gas and/or expanded to desorb $CO_2$, and the resultant solvent is subjected to thermal regeneration to desorb $H_2S$, the improvement comprising conducting the $CO_2$ desorption at two or more different temperature levels in at least two serially connected steps, wherein the solvent at a first temperature, partially freed of $CO_2$ by stripping with a stripping gas in a first stripping step, is heated to a higher temperature than said first temperature and further treated with a stripping gas in a second stripping step for the further desorption of $CO_2$, said higher temperature being lower than the resultant regenerated solvent withdrawn from the thermal regeneration zone.

3. A process according to claim 2, wherein less stripping gas is employed in the second stripping step than in the first stripping step.

4. A process according to claim 3, wherein less than about 50% of the amount of stripping gas utilized for the first stripping gas is employed in the second stripping step.

5. A process according to claim 3, wherein about 10–30% of the amount of stripping gas utilized for the first stripping gas is employed in the second stripping step.

6. A process according to claim 2, wherein the loaded solvent is partially freed of $CO_2$ in a first pressure stage, is further expanded at a low temperature heated to a higher temperature level, and then fed into a phase separator; and cooling resultant gaseous, $CO_2$-containing fraction from said phase separator and recycling resultant cooled fraction into the first pressure stage, and passing resultant liquid fraction from the phase separator to the thermal regeneration stage to remove $H_2S$.

7. A process according to claim 2, wherein lower temperature solvent partially freed of $CO_2$ is heated to the higher temperature by heat exchange against regenerated solvent from said thermal regeneration stage.

8. A process according to claim 6, wherein lower temperature solvent partially freed of $CO_2$ is heated to the higher temperature by heat exchange against regenerated solvent from said thermal regeneration stage.

9. A process according to claim 2, wherein the temperature difference between two different temperature levels is about 30°–80° C.

10. A process according to claim 2, wherein the temperature difference between two different temperature levels is about 30°–80° C.

11. A process according to claim 6, wherein the temperature difference between two different temperature levels is about 30°–80° C.

12. A process according to claim 7, wherein the temperature difference between two different temperature levels is about 30°–80° C.

13. A process according to claim 9, wherein the temperature difference between two different temperature levels is about 30°–80° C.

14. A process according to claim 2, wherein the temperature difference between the two different temperature levels is about 50°–70° C.

15. A process according to claim 6, wherein the temperature difference between the two different temperature levels is about 50°–70° C.

16. A process according to claim 7, wherein the temperature difference between the two different temperature levels is about 50°–70° C.

17. A process according to claim 2, the lower temperature level being sufficiently low to enable resultant solvent to cool regenerated solvent by indirect heat exchange to about the operating temperature of a low temperature upstream main scrubbing stage, and conducting said indirect heat exchange.

18. A process according to claim 2 wherein at least one of the higher temperature $CO_2$ removing steps is independent and distinct from another $CO_2$-removing step conducted at a different temperature.

19. A process according to claim 2, wherein the physical solvent possesses a selectivity for $H_2S$ as compared to $CO_2$.

20. A process according to claim 2, wherein the physical solvent is methanol.

21. A process according to claim 2, wherein a residual gas stream comprising stripping gas, and a substantial amount of the remaining amount of $CO_2$ present in the physical solvent is recycled to the first stripping step.

22. A process according to claim 2, wherein the process is conducted without utilizing a fresh physical solvent as a stripping agent.

23. A process according to claim 2, wherein the $CO_2$ desorption conducted in the first and second stripping steps is carried out under substantially isobaric conditions.

* * * * *